United States Patent [19]

Martin

[11] Patent Number: 4,599,544
[45] Date of Patent: Jul. 8, 1986

[54] VEHICLE HEADLAMP BEAM CONTROL

[75] Inventor: Robert A. Martin, Anderson, Ind.

[73] Assignee: General Motors Corporation, Detroit, Mich.

[21] Appl. No.: 613,459

[22] Filed: May 24, 1984

[51] Int. Cl.⁴ .............................................. B60Q 1/02
[52] U.S. Cl. .................................. 315/83; 307/10 LS; 315/82
[58] Field of Search ................ 315/82, 83; 307/10 LS

[56] References Cited

U.S. PATENT DOCUMENTS

| 1,917,532 | 7/1933 | Lowenstein | 315/83 |
| 2,679,616 | 5/1954 | Onksen et al. | 315/83 |
| 2,742,592 | 4/1956 | Miller et al. | 315/83 |
| 2,965,798 | 12/1960 | Cade | 315/83 |
| 3,177,397 | 4/1965 | Keeran | 315/83 |
| 3,381,169 | 4/1968 | Brock et al. | 315/83 |
| 3,775,639 | 11/1973 | Woodward | 315/83 |
| 4,117,453 | 9/1978 | Hodgson et al. | 340/76 |

Primary Examiner—Harold Dixon
Attorney, Agent, or Firm—Robert M. Sigler

[57] ABSTRACT

A control for a motor vehicle headlamp system includes a silicon photovoltaic diode in a short circuit connection across the inputs of an operational amplifier. The diode is disposed behind a lens and baffle to respond only to the light from oncoming vehicles and not to that reflected from roadside objects. The output of the operational amplifier is applied either directly or through an operator adjustable voltage divider to one input of a comparator having a predetermined reference voltage at its other input. The output of the comparator controls the selection of upper or lower beam generators and also switch means to switch in or out the voltage divider so as to provide hysteresis in system operation with the lower-to-upper beam switching level independent of the operator controlled upper-to-lower beam switching level.

3 Claims, 3 Drawing Figures

VEHICLE HEADLAMP BEAM CONTROL

BACKGROUND OF THE INVENTION

This invention relates to controls for vehicle headlamp beams which automatically switch between lower and upper beams in response to the light level from oncoming vehicles. Such controls must provide sufficient sensitivity in switching from upper beam to lower beam to minimize the possibility of directing the upper beam at close range into the eyes of oncoming drivers. However, excessive sensitivity in switching from upper to lower beam may cause erratic operation or cycling between upper and lower beam due to reflected light from road signs and other objects. Both of these considerations have become more important since the introduction of halogen headlamps. Therefore, a balance or optimization of sensitivity in switching from upper to lower beam is desired whereby an upper beam will be provided up to a reasonable distance, such as 1500 to 1800 feet, from an approaching vehicle in spite of reflections from road signs and other objects and a lower beam will be provided for closer distances and held low even when the approaching vehicle lights are switched to lower beam.

In addition to the above criteria, most such automatic headlamp beam controls include an operator adjustment whereby the vehicle operator may manually adjust the switching sensitivity of the control. However, in past systems, this sensitivity control produced simultaneous changes in both the upper-to-lower and lower-to-upper switching levels. This is undesirable for the optimization described above since, at the extreme low or high settings of the driver control the sensitivity may either be so low that cycling between upper and lower beam will occur or so high that the unit will be slow to return to upper beam when the approaching vehicle has passed. This difficulty is eliminated if the driver control adjusts the upper-to-lower switching level while not affecting the lower-to-upper switching level.

SUMMARY OF THE INVENTION

This invention, therefore, is a motor vehicle headlamp beam control which is responsive to the sensed intensity of light from oncoming vehicles to generate a signal varying with that intensity and which automatically switches from upper-to-lower beam when said signal exceeds a first predetermined reference and from lower-to-upper beam when said signal falls below a second predetermined reference lower than the first. When the upper beam is selected, the signal is modified in the direction of reduced indicated light intensity, with the amount of modification being adjustable by the driver. The apparatus thus exhibits hysteresis in switching between upper and lower beam but the driver control changes only the upper-to-lower beam switching level without affecting the lower-to-upper beam switching level. In addition, the invention provides fast response time, good temperature stability and freedom from spurious responses to reflected light from roadside objects.

Further details and advantages of this invention will be apparent from the accompanying drawings and following description of a preferred embodiment.

DESCRIPTION OF THE PREFERRED EMBODIMENT

Figure 1:
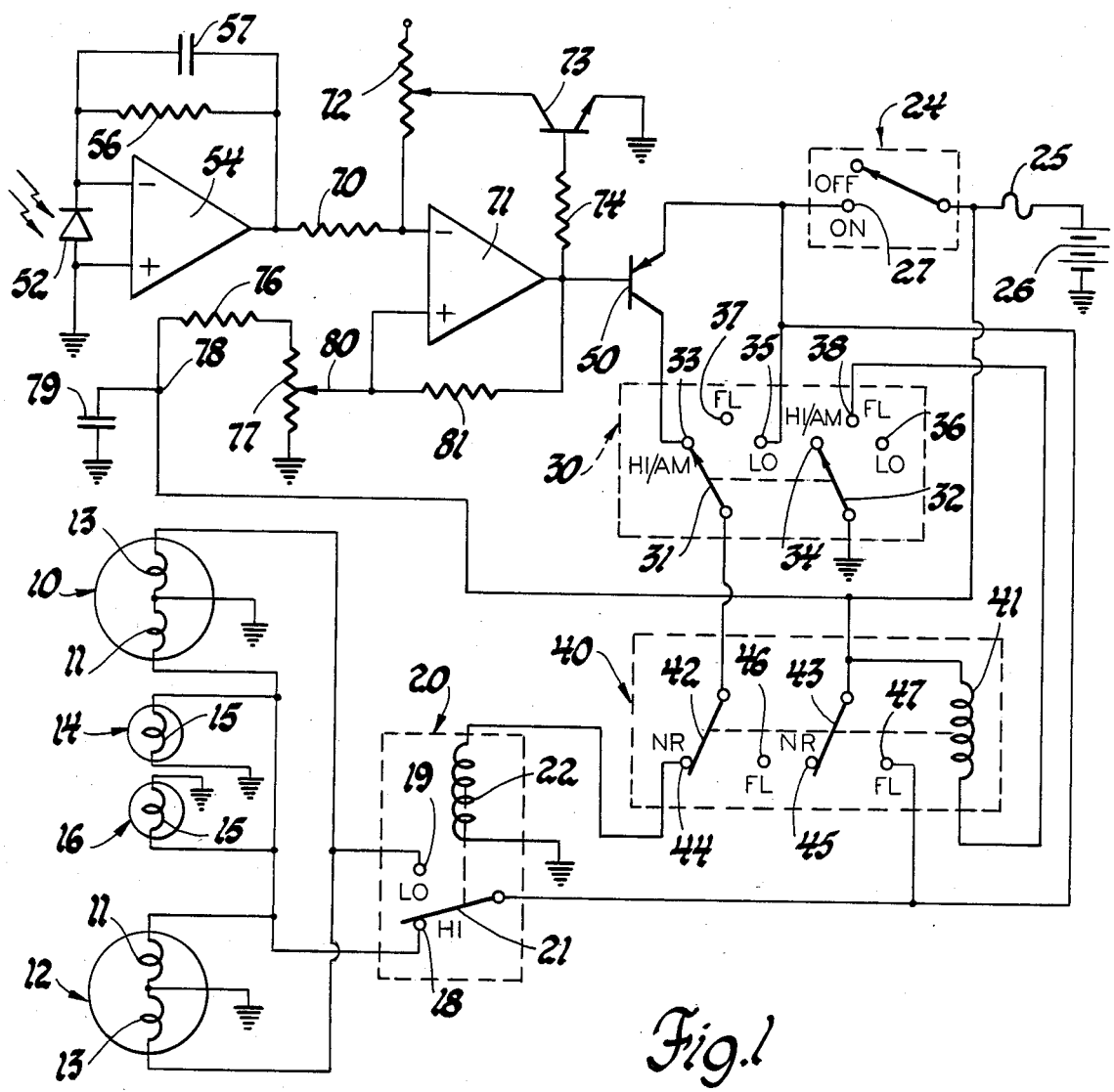
FIG. 1 is a circuit diagram of a preferred embodiment of a control according to this invention.

Referring to FIG. 1, a motor vehicle has main headlamps 10, 12 with upper beam filaments or generators 11 and lower beam filaments or generators 13 each having a grounded terminal. Additional headlamps 14 and 16 each include upper beam filaments or generators 15 with one grounded terminal. The other ends of all the upper beam filaments 11, 15 are connected in parallel to the normally closed HI terminal 18 of a relay 20; while the other terminals of lower beam filaments 13 are connected in parallel to the normally open LO terminal 19 of relay 20. Relay 20 further includes an armature 21 and an actuating coil 22. Armature 21 is connected through a normal headlamp switch 24, which is simplified in this figure, and a fuse 25 to a source of electric power such as a vehicle battery 26. Closure of switch 24 thus causes the upper beam filaments 11, 15 of the headlamps to be energized from battery 26 until armature 21 is drawn from terminal 18 to terminal 19 by actuating coil 22, following which the lower beam filaments 13 are energized from battery 26. Armature 21 returns to terminal 18 upon the end of energization of actuating coil 22 to reenergize the upper beam filaments 11, 15.

The system includes a dimmer switch 30 having a pair of armatures 31 and 32 mechanically connected for common movement (or an armature with separate contacts 31 and 32). The armatures 31 and 32 have first stable positions in which they are connected to HI/AM terminals, 33 and 34 respectively, and second stable positions in which they are connected to LO terminals, 35 and 36 respectively. Each of armatures 31 and 32 may be actuated momentarily by the vehicle operator into a third position contacting an FL terminal, 37 and 38 respectively.

The system further includes a demand upper beam relay 40 having an actuating coil 41 with one end connected to terminal 38 of dimmer switch 30 and the other end connected through fuse 25 to battery 26. Relay 40 includes a pair of armatures 42 and 43 mechanically connected for common movement (or an armature with separate contacts 42 and 43) and normally contacting a pair of NR terminals 44 and 45, respectively, with actuating coil 41 unenergized. When actuating coil 41 is energized, the armatures 42 and 43 engage FL terminals 46 and 47, respectively. Armature 42 of demand upper beam relay 40 is connected to armature 31 of dimmer switch 30; and armature 43 of demand upper beam relay 40 is connected through fuse 25 to battery 26. Terminal 47 of demand upper beam relay 40 and terminal 35 of dimmer switch 30 are both connected to armature 21 of relay 20 and the ON terminal 27 of switch 24. Terminal 44 of demand upper beam relay 40 is connected through actuating coil 22 of relay 20 to ground. Terminals 45 and 46 of demand upper beam 40 and terminals 34, 36 and 37 of dimmer switch 30 have no connection. Armature 32 of dimmer switch 30 is grounded, and terminal 33 of dimmer switch 30 is connected to the collector of a PNP transistor 50 (5958867) having an emitter connected to ON terminal 27 of switch 24. Transistor 50 further has a base for controlling the current flowing from emitter to collector therethrough.

With switch 24 closed and dimmer switch 30 in the LO position, electric power is supplied from battery 26 through fuse 25, switch 24 and armatures 31 and 42 to actuating coil 22, which causes engagement of armature 21 to terminal 19 and the resulting energization of low beam filaments 13. With switch 24 closed and dimmer switch 30 in the HI/AM position, armatures 31 and 42 and actuating coil 22 are connected in series with battery 26 through the emitter-collector junction of transistor 50. Thus, if transistor 50 is biased into conduction, actuating coil 22 will cause engagement of armature 21 with terminal 19 to energize low beam filaments 13; but if transistor is biased into non-conduction, armature 21 will be allowed to engage terminal 18 to cause energization of upper beam filaments 11, 15. With switch 24 closed and dimmer switch 30 actuated into its FL position, a conduction path is created from battery 26 and fuse 25 through coil 41 and armature 32 to ground; and the armatures 42 and 43 are moved to disconnect armature 42 from terminal 44 and connect armature 43 to terminal 47. With armature 43 engaged with terminal 47, upper beam filaments 11, 15 are energized through armatures 43 and 21, since actuating coil 22 is deenergized. With switch 24 open, electric power is removed from armature 21; and all headlamp filaments are deenergized.

The structure and operation of the system as described to this point is conventional and currently used in the Guidematic (R) headlamp system included on some vehicles manufactured by the assignee of this invention. The portion of this system yet to be described comprises that which differs from the prior art.

The light sensing element of the system is a silicon photovoltaic junction diode 52 (UTS 4075) which is connected across the inverting and non-inverting inputs of an operational amplifier 54 (½ CA3260) in a "short circuit" mode with the cathode of diode 52 connected to the inverting input and the anode connected to the grounded non-inverting input of operational amplifier 54. Parallel resistor 56 (22M) and capacitor 57 (0.005 mfd) are connected in feedback from the output to the inverting input of operational amplifier 54. This mode of operation minimizes the effects of the inherent temperature instability of silicon diode 52 in this circuit, since both terminals of diode 52 appear to be at zero potential. Temperature variations cause the current through diode 52 and the feedback current through resistor 56 to vary in equal but opposite directions in order to maintain zero potential at the inverting input of operational amplifier 54. The operation of the system is thus relatively temperature insensitive and repeatable.

Figure 2:
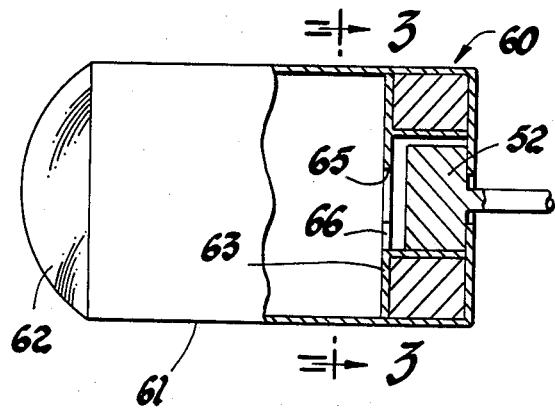
FIG. 2 is a partial cutaway view of a light sensor for use in the circuit of FIG. 1.
Figure 3:
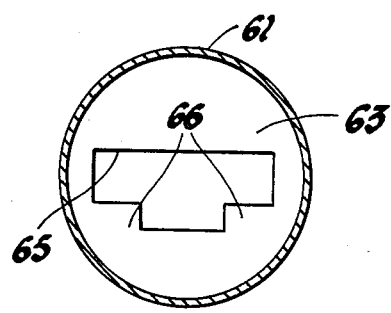
FIG. 3 is a cutaway view along lines 3—3 in FIG. 2.

Referring to FIGS. 2 and 3, diode 52 is contained within a lens and baffle unit 60 having a cylindrical body 61 with a lens 62 at one end thereof and a baffle 63 in front of diode 52 at the other end thereof. As seen best in FIG. 3, baffle 63 has a window opening 65 which is generally rectangular in shape but includes a pair of light cutoff portions 66 at the lower corners thereof to reduce the opening in the area most likely to receive reflected light from signs and other objects at the side of the road. The lens 62, of course, is designed to receive light from a wide angle and redirect it toward baffle 63 at the back of cylindrical body 61. Only that light directed at opening 65 will pass therethrough and be sensed by diode 52. Lens and baffle unit 60 is mounted in a convenient spot such as on the dashboard of the vehicle facing forward to receive the light from oncoming vehicles. Other details of the unit's construction and location will be obvious to those skilled in the art.

The output of operational amplifier 54 is connected through a resistor 70 (2.2k) to the inverting input of an operational amplifier 71 (½ CA3260), which inverting input is also connected through a variable resistor 72 (5k max) to the collector of a PNP transistor 73 (5958866) having a grounded emitter and a base connected through a resistor 74 (47k) to the output of operational amplifier 71.

A series pair of resistors 76 (270k) and 77 (10k max) are connected between a junction 78 and ground, with junction 78 connected through a capacitor 79 (40 mfd) to ground and further through fuse 25 to battery 26. Resistor 77 includes a tap 80, which provides a variable voltage output of the voltage divider and is connected to the non-inverting input of operational amplifier 71, which input is further connected in positive feedback through a resistor 81 (1M) to the output thereof. The output of operational amplifier 71 is connected to the base of transistor 50 in order to control the conduction thereof.

The operation of the circuit will now be described. Tap 80 of variable resistor 77 is adjusted so that operational amplifier 71 switches from a grounded output state sufficient to bias transistor 50 into conduction and thus select low beam operation to a high voltage output state sufficient to stop the conduction of transistor 50 and select upper beam energization as the lens illumination level drops past the lower-to-upper beam switching level. This adjustment is ordinarily not available to the driver in vehicle operation but may be performed during vehicle assembly and may be available for service. With lens illumination below this level, the upper beam filaments 11, 15 are energized. With a high output from operational amplifier 71, transistor 73 is biased into conduction so that a voltage divider comprising resistor 70 and variable resistor 72, which is driver adjustable, is formed between the output of operational amplifier 54 and ground. The output of this voltage divider is provided to the inverting input of operational amplifier 71 and comprises a driver-selectable fraction of the output voltage of operational amplifier 54. This reduces the voltage on the inverting input of operational amplifier 71 to require an even greater lens illumination level from switching from upper beam to lower beam operation. When the lens illumination level becomes sufficiently high to cause this switch, however, the resultant ground level output of operational amplifier 71 turns off transistor 73 to remove variable resistor 72 from the circuit and allow the full output voltage of operational amplifier 54 to be applied to the inverting input of operational amplifier 71. Not only does this provide the required hysteresis, but it also prevents the driver controlled variable resistor 72 from affecting the switching level from lower-to-upper beam operation.

In addition to the advantages already listed, the circuit exhibits a fast response time in lower-to-upper beam switching in response to a sudden removal of 100 foot candles of light which had been present for 10 seconds. An acceptable response time to this test is 1.0 seconds; but response time for this circuit is typically 0.2 to 0.3 seconds. This fast response results from the inherent speed of the silicon detector and the positive feedback resistor 81 around operational amplifier 71 and is desirable in restoring upper beam illumination for the driver as soon as possible after the passing of the oncoming vehicle.

In the preceding description, component values or identification for some components are provided in parentheses at the first recitation of the component. It is understood that these are actual values from a tested embodiment of the invention but are not critical to the invention or limiting. Variations of the embodiment shown will occur to those skilled in the art and should be considered further embodiments of the invention if described by the following claims.

I claim:

1. Control apparatus for a motor vehicle headlamp system including selectable upper and lower beam generators, the control apparatus comprising:

first means effective to generate a signal voltage varying with the sensed intensity of light from the headlamps of oncoming vehicles;

second means comprising a comparator with a first input at a constant predetermined voltage and a second input connected through a first resistor to the output of the first means, the second means further comprising a second resistor connectible to ground by switch means controlled by the output of the comparator to connect the second resistor, and thus reduce the portion of the signal voltage provided to the second input of the comparator, when said portion falls below the constant predetermined voltage and disconnect the second resistor, and thus provide the full signal voltage to the second input of the comparator, when the portion exceeds the constant predetermined voltage, the second resistor having a resistance variably controlled by the vehicle operator; and third means effective, in response to the comparator output, to select the upper or lower beam generator, respectively, when the perceived light intensity from oncoming vehicles, as embodied in the voltage input to the second input of the comparator, falls below or exceeds, respectively, that corresponding to the constant predetermined voltage, whereby the apparatus exhibits hysteresis in switching between upper and lower beam generators but the lower-to-upper switching illumination level remains constant regardless of operator induced variations in the upper-to-lower switching illumination level.

2. Control apparatus for a motor vehicle headlamp system including selectable upper and lower beam generators, the control apparatus comprising:

first means comprising a silicon photovoltaic diode in a short circuit connection between the inverting and non-inverting inputs of an operational amplifier having a grounded non-inverting input and negative feedback, the silicon photovoltaic diode being responsive to the sensed intensity of light from oncoming vehicles, the first means being thus effective to generate a corresponding signal voltage at the output of the operational amplifier;

second means comprising a comparator with a first input at a constant predetermined voltage and a second input connected through a first resistor to the output of the first means, the second means further comprising a second resistor connectible to ground by switch means controlled by the output of the comparator to connect the second resistor, and thus reduce the portion of the signal voltage provided to the second input of the comparator, when said portion falls below the constant predetermined voltage and disconnect the second resistor, and thus provide the full signal voltage to the second input of the comparator, when the portion exceeds the constant predetermined voltage, the second resistor having a resistance variably controlled by the vehicle operator; and third means effective, in response to the comparator output, to select the upper or lower beam generator, respectively, when the perceived light intensity from oncoming vehicles, as embodied in the voltage input to the second input of the comparator, falls below or exceeds, respectively, that corresponding to the constant predetermined voltage, whereby the apparatus exhibits hysteresis in switching between upper and lower beam generators but the lower-to-upper switching illumination level remains constant regardless of operator induced variations in the upper-to-lower switching illumination level.

3. Control apparatus for a motor vehicle headlamp system including selectable upper and lower beam generators, the control apparatus comprising:

first means comprising a silicon photovoltaic diode in a short circuit connection between the inverting and non-inverting inputs of an operational amplifier having a grounded non-inverting input and negative feedback, the silicon photovoltaic diode being disposed behind a lens exposed to the light from oncoming vehicles and effective to direct said light toward the silicon photovoltaic diode, the lens further cooperating with a baffle having an opening generally rectangular with light blocking inserts in the lower corners thereof to allow light from oncoming vehicles but prevent light reflected from roadside objects to reach the silicon photovoltaic diode, the first means being thus effective to generate a signal voltage corresponding to the intensity of illumination from oncoming vehicles at the output of the operational amplifier;

second means comprising a comparator with a first input at a constant predetermined voltage and a second input connected through a first resistor to the output of the first means, the second means further comprising a second resistor connectible to ground by switch means controlled by the output of the comparator to connect the second resistor, and thus reduce the portion of the signal voltage provided to the second input of the comparator, when said portion falls below the constant predetermined voltage and disconnect the second resistor, and thus provide the full signal voltage to the second input of the comparator, when the portion exceeds the constant predetermined voltage, the second resistor having a resistance variably controlled by the vehicle operator; and third means effective, in response to the comparator output, to select the upper or lower beam generator, respectively, when the perceived light intensity from oncoming vehicles, as embodied in the voltage input to the second input of the comparator, falls below or exceeds, respectively, that corresponding to the constant predetermined voltage, whereby the apparatus exhibits hysteresis in switching between upper and lower beams but the lower-to-upper switching illumination level remains constant regardless of operator induced variations in the upper-to-lower switching illumination level.

* * * * *